United States Patent [19]

Ahmed

[11] Patent Number: 5,009,835
[45] Date of Patent: Apr. 23, 1991

[54] NUCLEAR FUEL ROD HELIUM LEAK INSPECTION APPARATUS AND METHOD

[75] Inventor: Hassan J. Ahmed, Irmo, S.C.

[73] Assignee: Westinghouse Electric Corp., Pittsburgh, Pa.

[21] Appl. No.: 301,414

[22] Filed: Jan. 25, 1989

[51] Int. Cl.⁵ .............................................. G21C 17/00
[52] U.S. Cl. .................... 376/251; 376/253; 376/450
[58] Field of Search .................. 376/251, 253, 450

[56] References Cited

U.S. PATENT DOCUMENTS

| | | | |
|---|---|---|---|
| 3,247,706 | 4/1966 | Rose et al. | 73/40.7 |
| 4,076,982 | 4/1978 | Ritter et al. | 250/288 |
| 4,117,333 | 9/1978 | John, Jr. | 250/380 |
| 4,260,886 | 4/1981 | Grilletto et al. | 250/288 |
| 4,405,860 | 8/1983 | Brunnee et al. | 250/288 |

FOREIGN PATENT DOCUMENTS 2402201  3/1979  France .
2402201  4/1979  France .

OTHER PUBLICATIONS

"GC/MS with Complete Microprocessor Control," by W. A. Wolsten Holme and J. N. Gerber, American Laboratory, Feb. 1977, pp. 59–74.

"Vacuum Lock-Sample Changer for a Mass Spectrometer," B. S. Prahallada Rao and S. R. Halbe, Journal of Physics E: Scientific Instruments, vol. 9, pp. 205–207.

Primary Examiner—Brooks H. Hunt
Assistant Examiner—N. Bhat
Attorney, Agent, or Firm—Joseph C. Spadacone

[57] ABSTRACT

An inspection apparatus and method for testing nuclear fuel rods for helium leaks includes the basic operative steps of constantly leaking helium at a predetermined known value into a test chamber containing a fuel rod to be tested, and sampling the atmosphere within the chamber and measuring the helium in the atmosphere. A measured helium value below a preset minimum helium value indicates a malfunction in the inspection apparatus, whereas a measured helium value above a preset maximum helium value indicates the existence of a helium leak from the fuel rods. On the other hand, a measured helium value between the minimum and maximum helium values indicates the absence of a helium leak from the fuel rod.

21 Claims, 2 Drawing Sheets

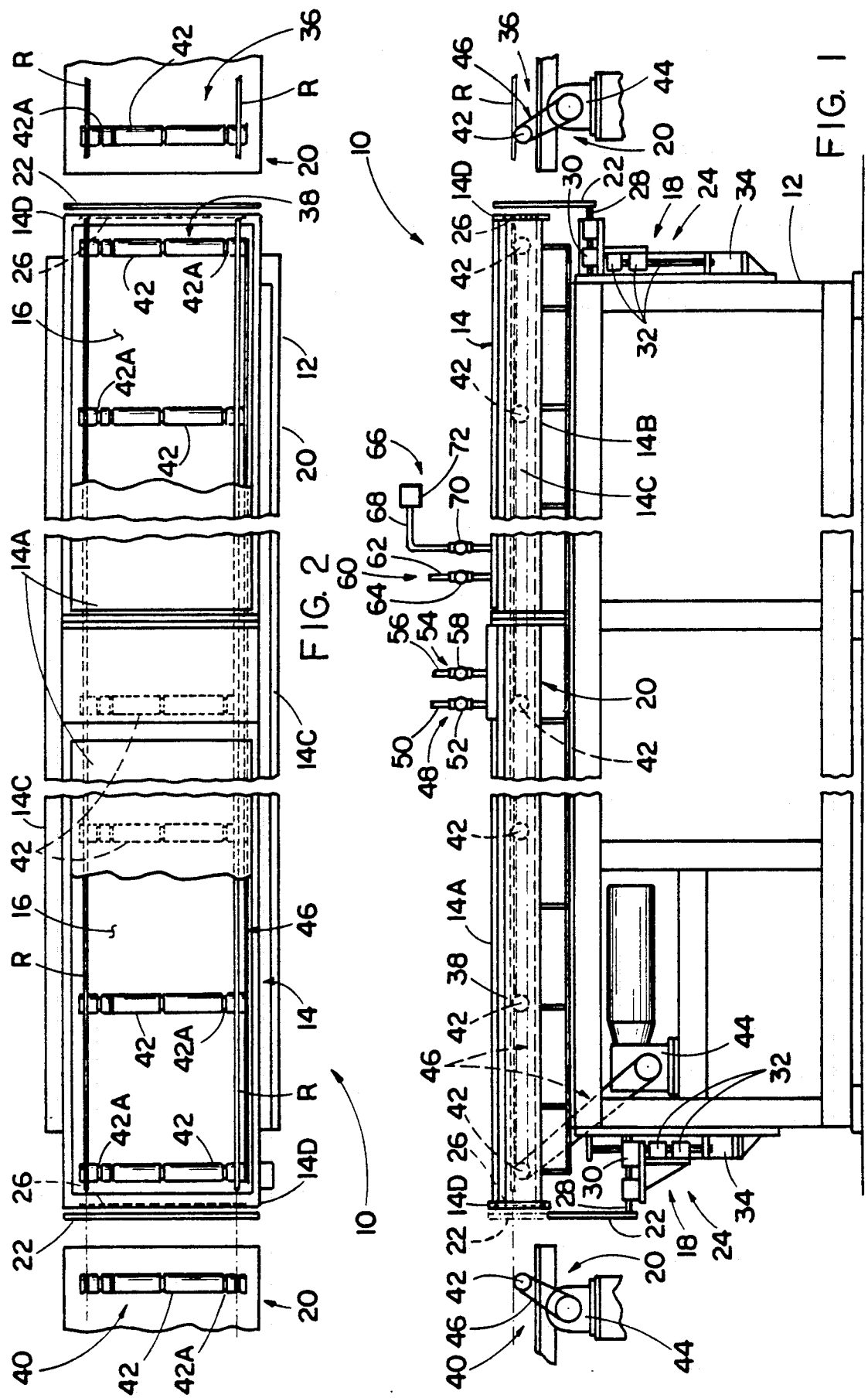

NUCLEAR FUEL ROD HELIUM LEAK INSPECTION APPARATUS AND METHOD

BACKGROUND OF THE INVENTION

1. Field of the Invention

The present invention relates generally to fuel rods for a nuclear reactor and, more particularly, is concerned with an apparatus and method for inspecting or testing the integrity of nuclear fuel rods which have been filled with helium under pressure and sealed.

2. Description of the Prior Art

As is well known, pressurized water nuclear reactors are more efficient when operated at higher temperatures and pressures. At higher water pressures more heat per unit weight of water can be derived from the fuel elements or rods in the reactor core, because the water can reach a higher temperature and thereby absorb more energy, before reaching boiling point at that pressure.

The useful life of the fuel rods can be prolonged if the fuel rods are internally pressurized to withstand the higher external coolant or water pressures in the reactor core and prevent tube collapse. Thus, during fabrication of fuel rods, it is accepted practice to pressurize the fuel rod with an inert gas, such as helium. Typically, a gas orifice is provided in one of the end plugs of the fuel rod for this purpose. After pressurization, the orifice is welded closed to seal the fuel rod.

In order to ensure weld and fuel rod tube integrity, an accepted procedure in quality control is to inspect or test fuel rods for helium leaks. The common method in use to test for helium leaks is to load a number of fuel rods in a tray and slide the loaded tray into a closed ended vacuum chamber. After a sufficient level of vacuum is achieved, the vacuum chamber is connected in communication with a test mechanism and sampled for helium by mass spectrometry. Other similar testing methods of the prior art are disclosed in U.S. Pat. No. 3,247,706 to Rose et al, U.S. Pat. No. 4,117,333 to John, and French Patent 2,402,201 to Morin.

All of these prior art testing methods have several drawbacks. One drawback is that the testing method typically involves a sequence of manual operations which are slow and introduce risk of operator error. Another drawback is that the helium leak detecting mechanism typically used in the testing method is referenced to a zero helium standard. That means if no helium is detected in the vacuum chamber then the conclusion of the test is that there is no helium leak in the fuel rods being tested. However, no safeguard is provided to distinguish a detection of zero helium caused by an equipment malfunction from one caused by a valid "no leak" condition of the fuel rods.

Consequently, a need exists for improvements in the manner in which nuclear fuel rods are inspected and tested for helium leaks to enhance efficiency and ensure reliability of testing procedures and results.

SUMMARY OF THE INVENTION

The present invention provides a nuclear fuel rod helium leak inspection apparatus and method designed to satisfy the aforementioned needs. Improvements introduced by the present invention over the prior at relate to the arrangement of end-to-end conveyors for transporting fuel rods into, through, and from the test chamber, a pair of end covers for the test chamber with mechanisms operable for moving the end covers to open and close the opposite ends of the test chamber, and a detecting mechanism which is referenced to a positive known helium leak rate standard rather than a zero helium standard. The positive standard is based on the fact that a constantly open leak at a predetermined minimum rate is always maintained in the test chamber. The positive standard allows the operator to discover an equipment malfunction when the helium detection response is close to zero, thereby preventing its interpretation as an "accept" signal.

More particularly, an "accept" or "reject" decision is now based on two set points of a leak rate detecting device of the inspection apparatus, such as a meter. If the response is below the lower one of the set points (which represents the minimum response to the constantly open leak standard in the test chamber), then a process fault signal is issued. If the response falls between the two set points, then an accept signal is issued and the fuel rods are conveyed out of the test chamber to the next inspection station. However, when the response is beyond the upper set point, then a reject signal is issued and the fuel rods will remain in the test chamber awaiting operator action. This logical sequence removes operator interference in the inspection and allows full integration of the method with the area material handling system.

Accordingly, the present invention is directed to an inspection apparatus for testing fuel rods for helium leaks. The inspection apparatus comprises: (a) a test chamber for receiving at least one nuclear fuel rod; (b) means for constantly leaking helium at a predetermined known value into the test chamber; and (c) means operable for sampling the atmosphere within the chamber and measuring the helium in the atmosphere such that a measured helium value (i) below a preset minimum helium value indicates a malfunction in the inspection apparatus, (ii) above a preset maximum helium value indicates the existence of a helium leak from the fuel rod, or (iii) between the minimum and maximum helium values indicates the absence of a helium leak from the fuel rod. Also, the inspection apparatus includes means operable for producing a predetermined vacuum condition within the test chamber prior to operating the sampling and measuring means, and means for transporting the nuclear fuel rod into, through, and from the test chamber. Further, the inspection apparatus includes means movable between first and second positions for respectively opening and closing opposite ends of the test chamber for transporting fuel rods into and from the chamber. Still further, the inspection apparatus includes means for purging the test chamber with a preselected gas when the opposite ends of the chamber are opened.

Also, the present invention is directed to an inspection method for testing fuel rods for helium leaks. The inspection method comprises the operative steps of: (a) constantly leaking helium at a predetermined known value into a test chamber; and (b) sampling the atmosphere within the chamber and measuring the helium in the atmosphere such that a measured helium value (i) below a preset minimum helium value indicates a malfunction in the inspection apparatus, (ii) above a preset maximum helium value indicates the existence of a helium leak from the fuel rod, or (iii) between the minimum and maximum helium values indicates the absence of a helium leak from the fuel rod. Also, the inspection method includes opening the test chamber at its opposite ends, and transporting the nuclear fuel rod to be tested into the test chamber through one open end thereof. Further, the inspection method includes purging the test chamber with a preselected gas when the opposite ends of the test chamber are opened, and producing a predetermined vacuum condition within the test chamber when the opposite ends thereof are closed.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a foreshortened and fragmentary side elevational view of an inspection apparatus of the present invention for testing nuclear fuel rods for helium leaks.

FIG. 2 is a top plan view of the inspection apparatus as seen along line 2—2 of FIG. 1.

DETAILED DESCRIPTION OF THE INVENTION

Figure 3:
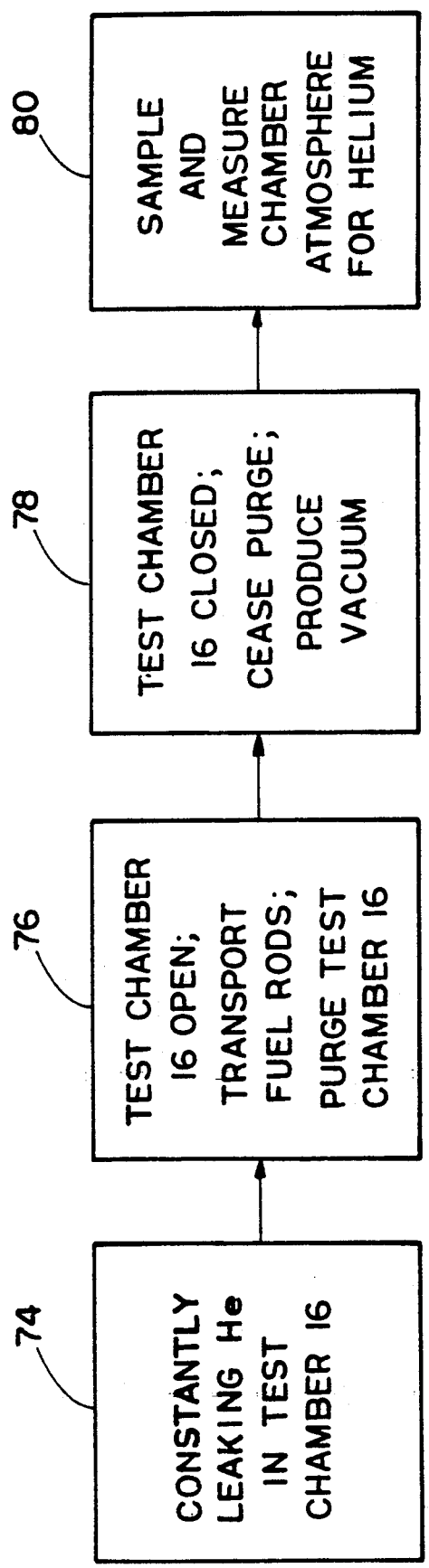
FIG. 3 is a block diagram of the helium leak inspection method of the present invention.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Referring now to the drawings, and particularly to FIGS. 1 and 2, there is shown an inspection apparatus, generally designated 10, for testing nuclear fuel rods R for helium leaks in accordance with the present invention. Basically, the inspection apparatus 10 includes a frame 12 and an elongated rectangular box-like structure 14 supported on the frame and defining a test chamber 16. The structure 14 is formed by a closed top 14A, a closed bottom 14B, a pair of closed opposite sides 14C, and a pair of open opposite ends 14D.

Also, the inspection apparatus 10 includes test chamber closure means 18 and fuel rod transport means 20. The test chamber closure means 18 are provided adjacent to each of the open opposite ends 14D of the box-like structure 14 and are operable for opening and closing the test chamber 16 at its opposite ends. More particularly, the test chamber closure means 18 includes a pair of rectangular-shaped plate-like end covers 22 and actuatable mechanisms 24 associated with the covers. The end covers 22 are capable of fitting against the open opposite ends 14D of the box-like structure 14 and thereby against seal rings 26 disposed thereon about the ends 14D to sealably close the opposite ends of the test chamber 16.

The actuatable mechanisms 24 of the inspection apparatus 10 are mounted to the opposite ends of the frame 12 and support the end covers 22 adjacent the open ends 14D of the structure 14. Each mechanism 24 includes a horizontal arrangement 28 of bearings and rods movably supporting each end cover 22 and a horizontal pneumatic cylinder 30 actuatable for moving the end cover 22 horizontally toward and away from the corresponding end 14D of the box-like structure 14. Also, each mechanism 24 includes a vertical arrangement 32 of bearings and rods movably supporting the horizontal arrangement 28 of bearings and rods and a vertical pneumatic cylinder 34 actuatable for moving the horizontal arrangement 28 and thereby the end cover 22 vertically between an upper position adjacent the structure ends 14D and a lower position remote therefrom to open and close the opposite ends of the test chamber 16.

The fuel rod transport means 20 of the inspection apparatus 10 is operable for transporting a plurality of side-by-side positioned nuclear fuel rods R, for instance twenty-five in number, into, through, and from the test chamber 16. The transport means 20 includes an arrangement of end-to-end conveyors: a first conveyor 36 mounted upstream of the entry end of the test chamber 16 for transporting the fuel rods R into the chamber; a second conveyor 38 mounted upon the bottom 14B of the structure 14 and located within the test chamber 16 for receiving the fuel rods R from the first conveyor 36, transporting the fuel rods through the chamber, and supporting the fuel rods in the chamber during the test; and a third conveyor 40 mounted downstream of the exit end of the test chamber 16 for transporting the fuel rods from the test chamber.

Each of the conveyors 36–40 is substantially identical in its arrangement of components. More particularly, each conveyor 36–40 includes a plurality of parallel spaced rollers 42 having a series of circumferential grooves 42A defined thereon. The grooves 42A of one roller 42 are aligned with corresponding grooves 42A on the other rollers 42 so as to support the fuel rods R at spaced locations therealong between their ends as seen in FIG. 2. Also, the transport means 20 includes a motor 44 and pulley and drive chain arrangement 46 drivingly coupled with the rollers 42 of each conveyor 36–40 for rotating the rollers.

Further, as schematically shown in FIG. 1, the inspection apparatus 10 includes means 48 connected in communication with the box-like structure 14 and being operable for purging the test chamber 16 with a gas, in the form of liquid nitrogen, when the opposite ends of the chamber 16 are opened. The purging means 48 includes a conduit 50 and control valve 52 connected to a source of liquid nitrogen (not shown). The apparatus 10 also includes helium supply means 54 connected in communication with the box-like structure 14 and being operable for constantly leaking helium at a predetermined positive, known value into the test chamber 16. In such manner, an atmosphere of helium of the known positive value is constantly being provided in the test chamber 16. The helium supply means 54 includes a conduit 56 a control valve 58 connected to a source of helium (not shown). Further, the apparatus 10 includes vacuum means 60 connected in communication with the box-like structure 14 and being operable for producing a predetermined vacuum condition within the test chamber 18 when the opposite ends thereof are closed. The vacuum means 60 includes a conduit 62 and a control valve 64 connected to a vacuum pressure producing source (not shown).

Finally, the inspection apparatus 10 includes means 66 connected in communication with the box-like structure 14 and being operable for sampling the atmosphere within the closed test chamber 16 and measuring the helium in the atmosphere of the chamber. The sampling and measuring means 66 includes a conduit 68, a control valve 70 and a test mechanism 72 connected thereto which incorporates equipment such as a leak rate meter and a mass spectrometer. In accordance with the present invention, the value of the helium measured by the test mechanism 72 is compared with preset or preselected minimum and maximum helium values for making a decision about the conditions of the fuel rods R in the test chamber 18 and thus whether to "accept" or "reject" the fuel rods R. If the measured helium value is below the preset minimum helium value (the positive helium leak rate standard), then a malfunction in the inspection apparatus 10 itself is indicated since the testing is carried out with a constant leaking of helium in the test chamber 16 at the minimum value. If the measured helium value is above the preset maximum helium value, then the existence of a helium leak from the fuel rods is indicated since the source of the leak has to be something more than just the constant leaked helium. Finally, if the measured helium value is between the minimum and maximum helium values, then the absence of a helium leak from the fuel rods is indicated.

Turning now to FIG. 3, there is shown a block flow diagram of the procedures involved in the method of inspecting or testing the nuclear fuel rods R for helium leaks in accordance with the present invention. As represented by block 74, the procedures are carried out as helium is constantly leaked at a predetermined positive, known rate or value into the test chamber 16 by appropriately setting the open condition of the control valve 58. As represented by block 76, when the test chamber 16 is open at its opposite ends by appropriate actuation of the mechanisms 24 for transporting previously tested fuel rods from the chamber and for transporting a new batch of fuel rods into the chamber through the respective open opposite ends thereof, the chamber is purged with liquid nitrogen by operation of control valve 52 for maintaining the chamber in a moisture-free condition. When the chamber is then closed, the purging operation ceases by closing the valve 52.

As represented by block 78, when the test chamber 16 is closed at its opposite ends by appropriate actuation of the mechanisms 24, the control valve 64 is operated to produce a predetermined vacuum condition within the test chamber. Preferably, the vacuum is pulled down to five microns of mercury. The leakage of helium in the chamber 16 continues as the vacuum condition is being produced. Once the vacuum condition is reached and the control valve 64 is then closed, the control valve 70 is operated.

As represented by block 80, when the control valve 70 is opened, the atmosphere within the test chamber 16 is sampled and measured for the helium in the atmosphere by the test mechanism 72. What the various levels of helium measurements mean has been described above. If a malfunction in the inspection apparatus 10 is indicated by the measured value, the operator is alerted so that appropriate action can be taken. The tested lot of fuel rods are not automatically released from the chamber. If the existence of a helium leak from the fuel rods is indicated by the measured value, the operator is again alerted so that appropriate action can be taken. Again, the tested lot of fuel rods are not automatically released from the chamber. However, if the absence of a helium leak from the fuel rod is indicated by the measured value, the fuel rods are automatically released from the chamber and the next batch is loaded. In the situation where the measured helium value is above the preset maximum helium value, the sampling and measuring is repeated a second time to ensure that the first measurement was not erroneous before the final decision is made that a helium leak is occurring from the fuel rods.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. An inspection apparatus for testing nuclear fuel rods for helium leaks, comprising:
    (a) a test chamber being openable and closable for receiving at least one nuclear fuel rod;
    (b) means separate from the fuel rod for supplying helium and constantly leaking helium at a predetermined known positive value into said test chamber to constantly provide an atmosphere of helium at said predetermined known positive value in said test chamber; and
    (c) means for sampling the atmosphere within said chamber and measuring the helium in the atmosphere such that a measured helium value (i) below a preset minimum helium value substantially equal to said predetermined known positive value of said atmosphere of helium being constantly provided in said test chamber indicates a malfunction in said inspection apparatus, (ii) above a preset maximum helium value greater than said predetermined known positive in said test chamber indicates the existence of a helium leak from the fuel rod, or (iii) between said preset minimum and maximum helium values indicates the absence of a helium leak from the fuel rod.

2. The inspection apparatus as recited in claim 1, further comprising:
    means operable for producing a predetermined vacuum condition within said test chamber prior to operating said sampling and measuring means.

3. The inspection apparatus as recited in claim 1, wherein said sampling and measuring means is a helium detecting mechanism which is referenced to a positive known helium leak rate standard.

4. The inspection apparatus as recited in claim 1, further comprising:
    means for transporting at least one nuclear fuel rod into, through, and from said test chamber.

5. The inspection apparatus as recited in claim 4, wherein said transporting means includes an arrangement of end-to-end conveyors, a first of said conveyors for transporting the fuel rod into said chamber, a second of said conveyors located within said chamber for supporting the fuel rod in said chamber and transporting the fuel rod through said chamber, and a third of said conveyors for transporting the fuel rod from the test chamber.

6. The inspection apparatus as recited in claim 1, wherein said test chamber is openable and closable at its opposite ends.

7. The inspection apparatus as recited in claim 6, further comprising:
    means movable between first and second positions for respectively opening and closing said opposite ends of said test chamber.

8. The inspection apparatus as recited in claim 7, wherein said movable means includes:

a pair of end covers for sealably fitting said opposite ends of said test chamber; and mechanisms operable for moving said end covers between said first and second positions to open and close said opposite ends of the chamber.

9. The inspection apparatus as recited in claim 1 further comprising:

means for purging said test chamber with a preselected gas when said opposite ends of said test chamber are opened.

10. The inspection apparatus as recited in claim 9, wherein said purging gas is liquid nitrogen.

11. An inspection apparatus for testing nuclear fuel rods for helium leaks, comprising:

(a) a test chamber being openable and closable at its opposite ends;

(b) means for transporting a plurality of nuclear fuel rods into, through, and from said test chamber;

(c) means movable between first and second positions for respectively opening and closing said opposite ends of said test chamber;

(d) means for purging said test chamber with a preselected gas when said opposite ends of said test chamber are opened;

(e) means separate from the fuel rod for supplying helium and constantly leaking helium at a predetermined known positive value into said test chamber to constantly provide an atmosphere of helium at said predetermined known positive value in said test chamber;

(f) means for producing a predetermined vacuum condition within said test chamber when said opposite ends thereof are closed; and (g) means for sampling the atmosphere within said chamber and measuring the helium in the atmosphere such that a measured helium value (i) below a preset minimum helium value substantially equal to said predetermined known positive value of said atmosphere of helium being constantly provided in said test chamber indicates a malfunction in said inspection apparatus, (ii) above a preset maximum helium value greater than said predetermined known positive value of said atmosphere of helium being constantly provided in said test chamber indicates the existence of a helium leak from the fuel rod, or (iii) between said preset minimum and maximum helium values indicates the absence of a helium leak from the fuel rod.

12. The inspection apparatus as recited in claim 11, wherein said sampling and measuring means is a helium detecting mechanism which is referenced to a positive known helium leak rate standard.

13. The inspection apparatus as recited in claim 11, wherein said transporting means includes an arrangement of end-to-end conveyors, a first of said conveyors for transporting the fuel rods into said chamber, a second of said conveyors located within said chamber for supporting the fuel rods in said chamber and transporting the fuel rods through said chamber, and a third of said conveyors for transporting the fuel rods from the test chamber.

14. The inspection apparatus as recited in claim 11, wherein said movable means includes:

a pair of end covers for sealably fitting said opposite ends of said test chamber; and mechanisms operable for moving said end covers between said first and second positions to open and close said opposite ends of the chamber.

15. The inspection apparatus as recited in claim 11, wherein said purging gas is nitrogen.

16. An inspection method for testing nuclear fuel rods for helium leaks, comprising the steps of:

(a) constantly leaking helium at a predetermined known positive value into a test chamber containing at least one fuel rod to constantly provide an atmosphere of helium at said predetermined known positive value in the test chamber; and (b) sampling the atmosphere within said chamber and measuring the helium in the atmosphere such that a measured helium value (i) below a preset minimum helium value substantially equal to the predetermined known positive value of said atmosphere of helium being constantly provided in the test chamber indicates a malfunction in the inspection apparatus, (ii) above a preset maximum helium value greater than the predetermined known positive value of the atmosphere of helium being constantly provided in the test chamber indicates the existence of a helium leak from the fuel rod, or (iii) between said preset minimum and maximum helium values indicates the absence of a helium leak from the fuel rod.

17. The inspection method as recited in claim 16, further comprising the step of:

prior to said sampling and measuring, opening the test chamber at its opposite ends; and transporting at least one nuclear fuel rod to be tested into the test chamber through one of said open ends thereof.

18. The inspection method as recited in claim 17 further comprising:

purging the test chamber with a preselected gas when the opposite ends of the test chamber are opened.

19. The inspection method as recited in claim 16, further comprising:

prior to said sampling and measuring, closing the test chamber at its opposite ends; and producing a predetermined vacuum condition within the test chamber when the opposite ends thereof are closed.

20. An inspection method for testing nuclear fuel rods for helium leaks, comprising the steps of:

(a) providing a supply of helium separate from the fuel rods;

(b) constantly leaking helium at a predetermined known positive value into a test chamber to constantly provide an atmosphere of helium at said predetermined known positive value in the test chamber;

(c) opening the test chamber at its opposite ends;

(d) transporting at least one nuclear fuel rod to be tested into the test chamber through one open end thereof;

(e) purging the test chamber with a preselected gas when the opposite ends of the test chamber are opened;

(f) producing a predetermined vacuum condition within the test chamber when the opposite ends thereof are closed; and (g) sampling the atmosphere within said chamber and measuring the helium in the atmosphere such that a measured helium value (i) below a preset minimum helium value substantially equal to the predetermined known positive value of said atmosphere of helium being constantly provided in the test chamber indicates a malfunction in the inspection apparatus, (ii) above a preset maximum helium value greater than the predetermined known positive value of the atmosphere of helium being constantly provided in the test chamber indicates the existence of a helium leak from the fuel rod, or (iii) between said preset minimum and maximum helium values indicates the absence of a helium leak from the fuel rod.

21. The inspection method as recited in claim 20, wherein said sampling and measuring is repeated a second time if a helium value above said preset maximum helium value is measured.

* * * * *